United States Patent [19]

Ferrentino

[11] 4,123,928

[45] Nov. 7, 1978

[54] HELIX WINDING APPARATUS

[75] Inventor: Antonio Ferrentino, Monza (Milan), Italy

[73] Assignee: Industrie Pirelli Societa per Azioni, Milan, Italy

[21] Appl. No.: 846,906

[22] Filed: Oct. 31, 1977

[30] Foreign Application Priority Data

Nov. 5, 1976 [IT] Italy .............................. 29041 A/76

[51] Int. Cl.² ............................................... B21F 3/04
[52] U.S. Cl. .......................................... 72/66; 72/142; 140/92.2
[58] Field of Search ................... 72/66, 142, 144, 145; 140/92.1, 92.2; 242/7.05 B, 7.14, 82

[56] References Cited

U.S. PATENT DOCUMENTS

| 3,371,876 | 3/1968 | Wilcox .............................. | 140/92.2 |
| 3,741,262 | 6/1973 | Bell et al. ........................ | 140/92.2 |

FOREIGN PATENT DOCUMENTS

| 48-2,889 | 1/1973 | Japan ................................. | 72/66 |
| 294,206 | 11/1928 | United Kingdom ............... | 72/144 |

*Primary Examiner*—E. M. Combs
*Attorney, Agent, or Firm*—Brooks, Haidt, Haffner & Delahunty

[57] ABSTRACT

Apparatus for winding a pair of elongated bodies, e.g. wires, on a mandrel in which a pair of bobbins and a U-shaped cage are rotatably mounted on a fixed shaft extending horizontally from a support slidably mounted on a pair of rails supported by a base. The arms of the cage extend on opposite sides of the peripheries of the bobbins and parallel to the axis of rotation of the bobbins, and the cage is motor driven. A mandrel with its axis aligned with the axis of the bobbins is supported by a cylindrical body rotatable with respect to the mandrel and a separable threaded connection with a rotatable sleeve in the shaft, and the body carries guide arms engageable with pins on the arms of the cage. A crank arm connected to the rotatable sleeve permits disengagement of the mandrel from the sleeve. The base also carries pneumatically operable arms which can be moved into and out of engagement with the cylindrical body and the mandrel to hold the body and the mandrel as the support is slid along the rails away from the mandrel to permit empty bobbins to be replaced.

10 Claims, 5 Drawing Figures

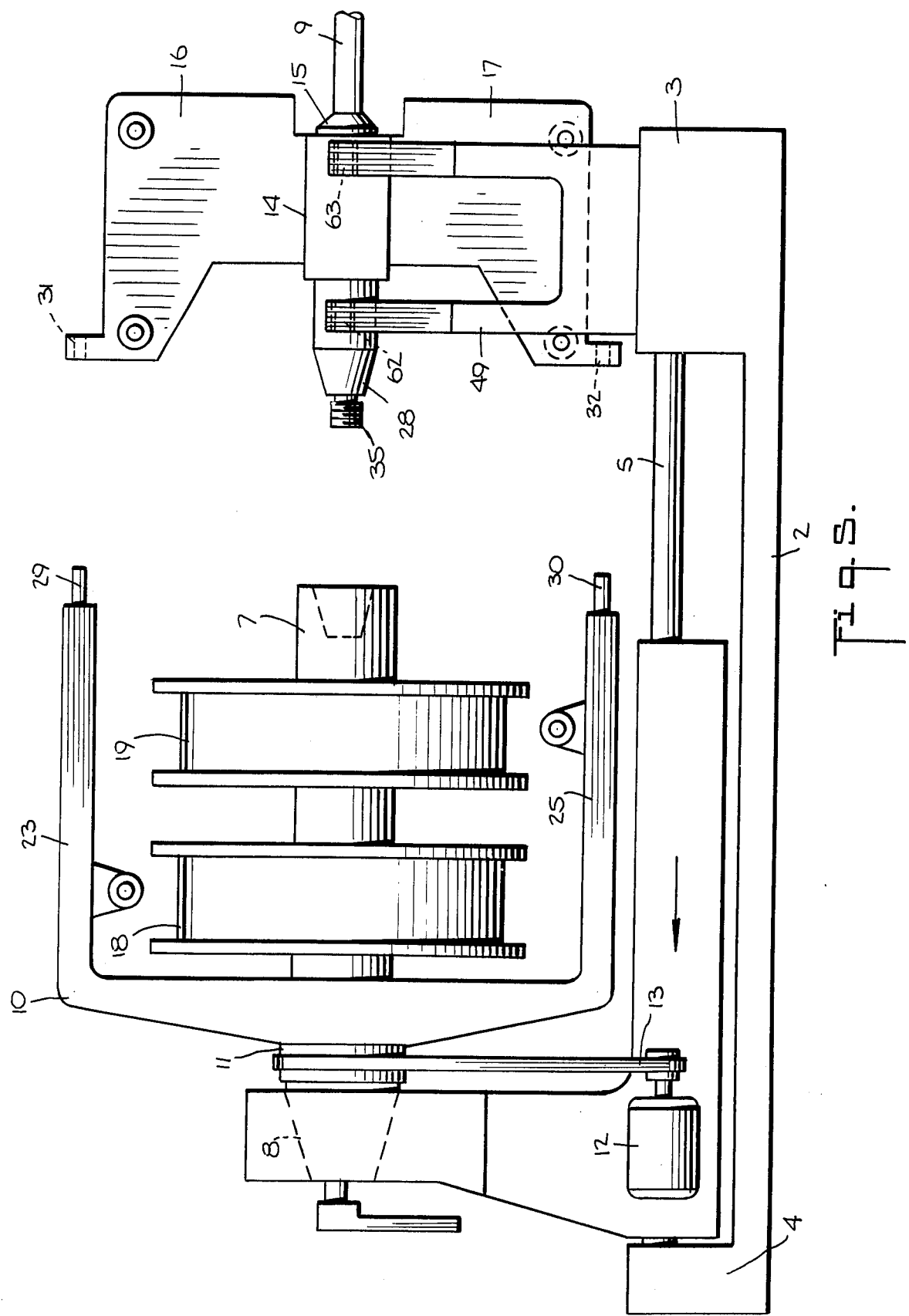

HELIX WINDING APPARATUS

The present invention concerns a winding apparatus for forming a helix of various materials. In particular, it refers to winding apparatus for forming a helix made by one or more elongated bodies, e.g. strands, wires, filaments, tapes, strips, or the like.

The apparatus of the type described comprises substantially a mandrel mounted in cantilever fashion on a base, a cage that rotates around the mandrel and one or more bobbins aligned in the middle of the cage onto which the elongated bodies are wound.

In operation, the rotation of the cage determines the unwinding of the elements, which are wound around the bobbins, and the simultaneous winding of the elements, in turns, around the mandrel.

Of all the various types of products that are obtainable through the means of a winding apparatus, one example is a tube substantially composed of an elastomeric material that is extruded upstream of the winding apparatus and then pushed through the apparatus along the mandrel where, because of the cage rotation, the tube receives the helical turns of one or more wires that constitute the reinforcing structure of the tube.

As a further example of a product obtainable with a winding apparatus, is a helix that is not supported internally by an underlying layer but is wound in turns in contact with the mandrel and gradually moved along the axis of the mandrel, the thrust action required for the movement being obtained by any appropriate mechanical system.

These turns are subsequently clad by means of an extruder, with a plastomeric or elastomeric layer, in such a way as to create a continuous tubular conduit as, for example, a tube for civil or industrial applied fields, or even for waveguides.

These machines are advantageously used for manufacturing products comprising a helix having a length equal to the length obtainable for the turns of the elongated element collected on the bobbins when the required product does not call for the continual exchange of empty bobbins for full ones. In such cases, when the product is already completed, and the helix has been completely removed from the mandrel for being wound onto the collecting drum, the empty bobbin is removed by simply taking it off the free end of the mandrel.

However, there are cases when the required product is obtained in a continuous way and is formed by a helix having a length such as to require a plurality of empty bobbins substituted for full ones, and during these exchanges of bobbins, the helix for various reasons is not removable. Unfortunately, in such cases, the winding apparatus known to-date have the drawback of not being suited for forming continuous products when helixes that are very long are needed.

The scope of this invention is, therefore, to provide an apparatus for forming helixes without the disadvantages mentioned hereinbefore.

One object of this invention is a winding apparatus for forming a helix, comprising a base, a horizontal shaft mounted in cantilever fashion on said base, a mandrel aligned with the shaft, at least one bobbin freely rotatable about the shaft and suitable for holding the turns of an elongated body or filament or the like, a winding cage placed around the shaft for unwinding the elongated body from the bobbin to then rewind it, in turns, around the mandrel. Said apparatus is characterized by the fact that it comprises a first and a second part, each separable one from the other, said first part comprising the base, the main shaft, the bobbin, the cage, said first part being separable from the second part in the direction of the axis of the mandrel and in the opposite sense to the formation of the helical turns on the mandrel. Said apparatus also comprises means for holding the second part when said first part is separated from the second part in the direction of the mandrel axis.

The machine described hereinbefore has the fundamental characteristic of comprising a separable part which can be separated from the mandrel. As a consequence, it has the advantage of allowing, with extreme facility, an operator to reach into the inside of the apparatus to take off the empty, used bobbins from the shaft and replace them with other full bobbins. All this is obviously done without altering the position of the already formed helix on the mandrel, and without removing any part, downstream of the mandrel, which is intended for completing the manufacture of the required product, such as, for example, the extruder (or press) for cladding the helix.

The objects and advantages of the invention will be better understood from the following description of a preferred embodiment thereof, which description should be considered in conjunction with the accompanying drawings, in which:

FIG. 5 is a side elevation view similar to FIG. 1 showing the winding mandrel separated from the shaft which supports the winding cage.

The invention is described hereinafter with reference to a winding apparatus for forming a helix with two starting elements that are not supported internally and with the turns disposed around the mandrel and in contact with it, the turns advancing on the said mandrel towards the free end of the latter. However, the principles of the invention are also applicable to the winding of such turns on other than a mandrel.

Figure 1:
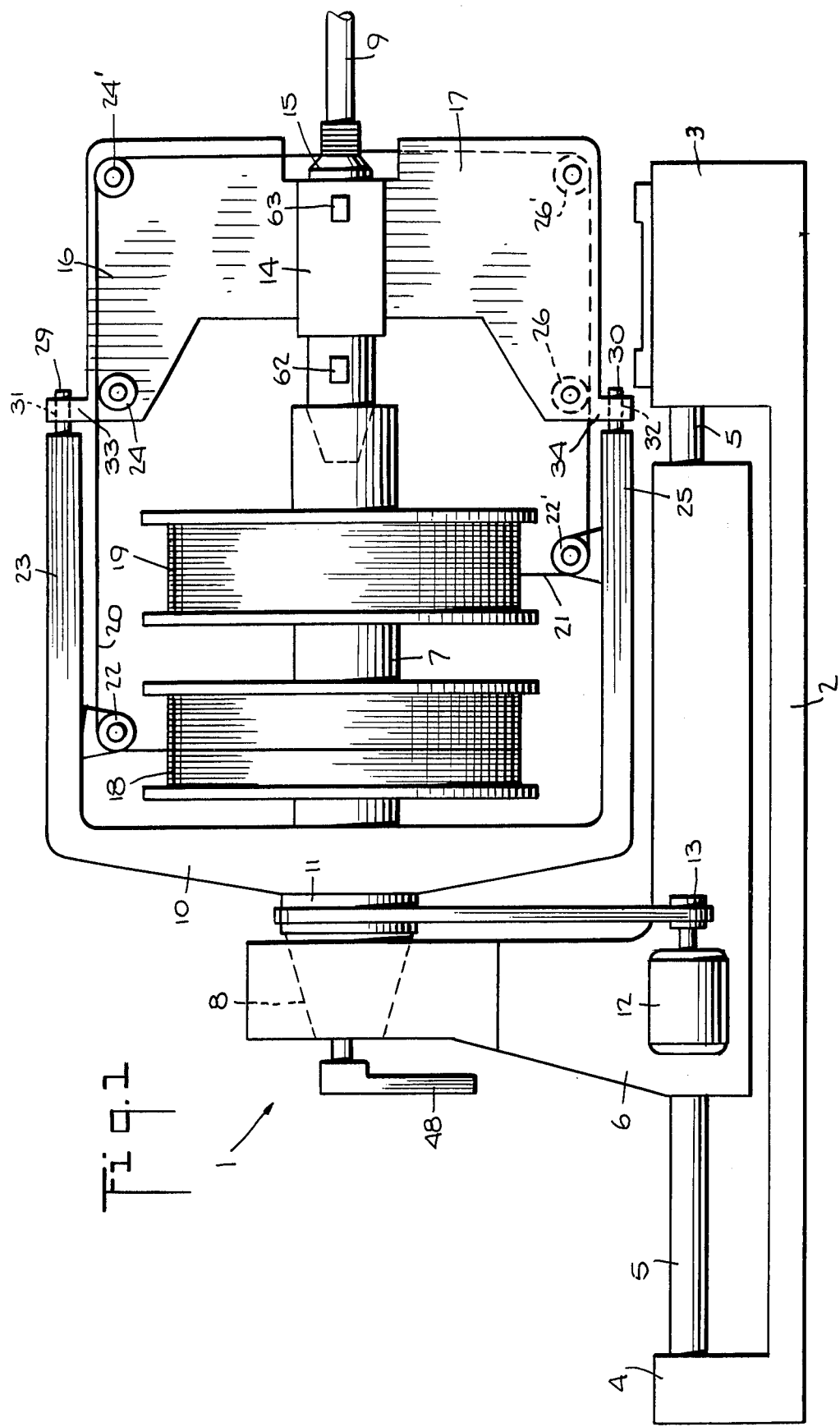
FIG. 1 is a side elevation view of the preferred embodiment of the winding apparatus of the invention with the supporting apparatus for temporarily supporting the winding mandrel removed for ease in illustration.

The winding apparatus 1 shown in FIG. 1 comprises a supporting structure 2 between the extremities 3 and 4 of which is placed a pair of rails 5 (only one of which is visible in FIG. 1). A base 6, which supports the rotatable part of the apparatus 1 and which slides along the rails 5, carries a horizontal shaft 7 secured in cantilever fashion in an opening 8 of the base 6. A mandrel 9 is aligned with the shaft 7, and a winding cage 10 with its driving pulley 11 is mounted so as to rotate about the shaft 7. A motor 12 is connected by a belt 13 with the pulley 11 for operating the cage 10. A cylindrical body 14, rotatable on the mandrel 9, is secured to a cam 15 for advancing the helical turns onto the mandrel 9. Connecting elements in the shape of plates 16 and 17, for connecting the cylindrical body 14 with the cage 10, are secured at one of their ends to the body 14.

On the inside of the winding cage 10 are disposed two bobbins, 18 and 19, which are rotatably mounted on the shaft 7. The bobbins 18 and 19 are filled respectively with the metallic wires 20 and 21 which are wound thereon. The wire 20 is guided by a pulley 22 of a first winding arm 23 of the cage 10, and from here, it runs on the pulleys 24 and 24' of the plate 16, towards the cam 15. The other wire 21 rides on a pulley 22' of the second winding arm 25 of the cage 10, and from here it runs on pulleys 26 and 26' of the plate 17 towards the cam 15.

The apparatus 1 comprises a first and a second part, coupled together when in operation and separable when the apparatus is at rest, for permitting an easy and rapid replacement of empty bobbins by full ones without disturbing the disposition of the helix on the mandrel 9.

The first part of the apparatus substantially comprises the elements which are secured to or carried by the shaft 7 on the base 6, and hence include the cage 10 and the bobbins 18 and 19. The second part comprises the elements which are associated with the mandrel 9, and hence includes the cylindrical body 14, the cam 15 and the plates 16 and 17. The second part of the apparatus is maintained suspended stationery in space by appropriate gripping or temporary supporting means when the first part is detached for changing a bobbin.

The two parts of the apparatus further comprise aligning means for aligning the shaft 7 with the mandrel 9, engaging means for engaging the cage 10 with the plates 16 and 17, and coupling means for coupling the shaft 7 to the mandrel 9.

Figure 2:
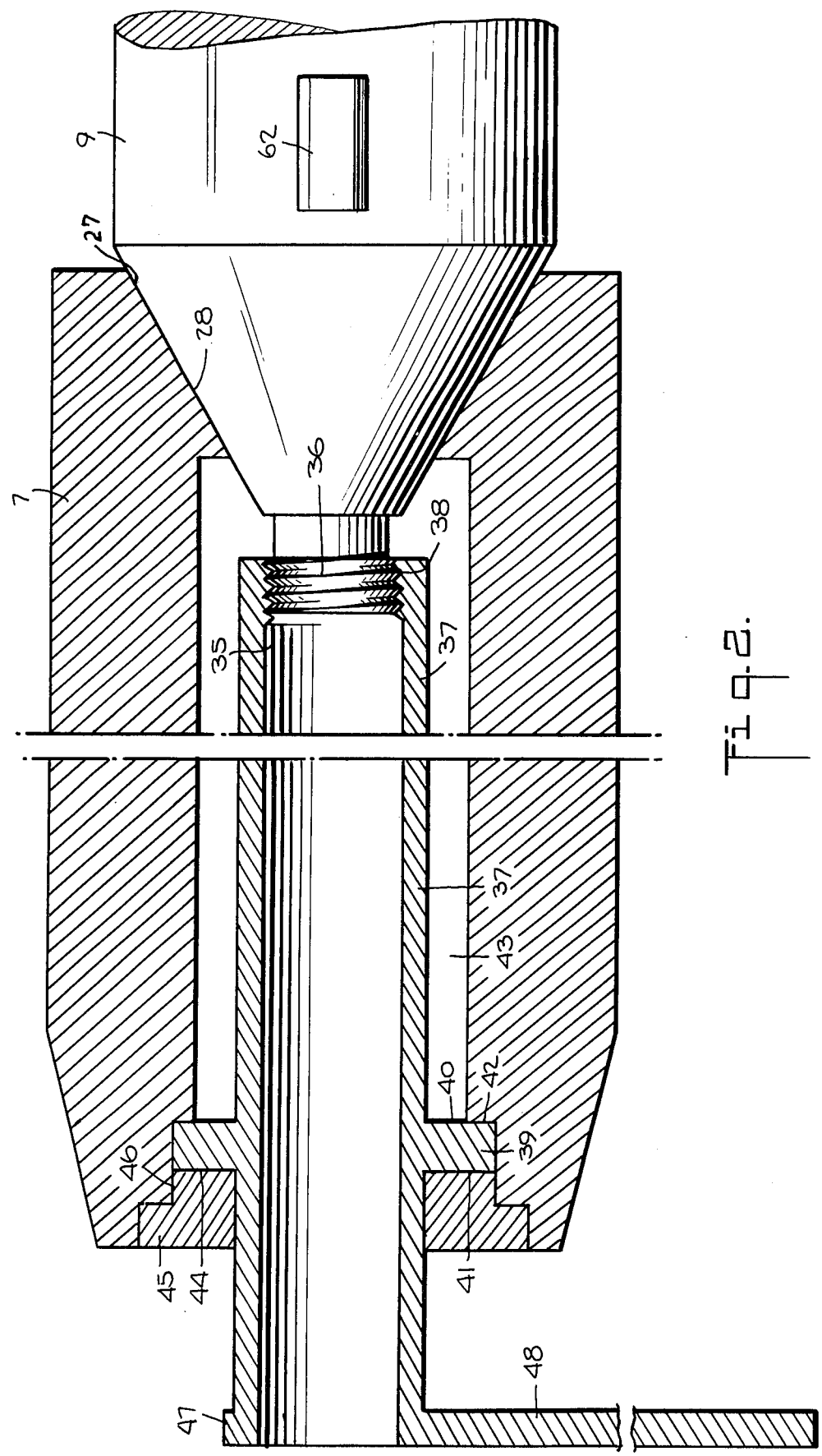
FIG. 2 is a fragmentary, enlarged side view, partly in cross section, of a portion of the apparatus shown in FIG. 1.

Said aligning means comprise (see FIG. 2) a frusto-conical opening 27 in the shaft 7, and a corresponding frusto-conical surface 28 on the mandrel 9.

Said engaging means comprise (FIG. 1) pins 29 and 30, at the extremities of the two winding arms 23 and 25, and corresponding holes 31 and 32 at the extremities 33 and 34 of the plates 16 and 17.

Said coupling means comprises (FIG. 2) a threaded surface 35 at the extremity 36 of the mandrel 9, a cylindrical sleeve 37 with an end 38 threaded internally to permit the threaded end 36 of the mandrel 9 to be screwed into it.

Said sleeve 37 also comprises a collar 39 with first and second circular surfaces 40 and 41, the first of which is suited for abutting a step 42, determined by an enlargement of a section of the cavity 43 in the shaft 7. The second surface 41 bears against the extremity 44 of a blocking ring 45, secured to the shaft 7 in an appropriate groove 46 inside the terminal end of the shaft 7. The sleeve 37 is rotatable with respect to the shaft 7.

The second extremity 47 of the sleeve 37 comprises a lever of crank arm 48 which protrudes from the apparatus and which can rotate in either sense for joining or for detaching the shaft 7 from the mandrel 9.

Figure 3:
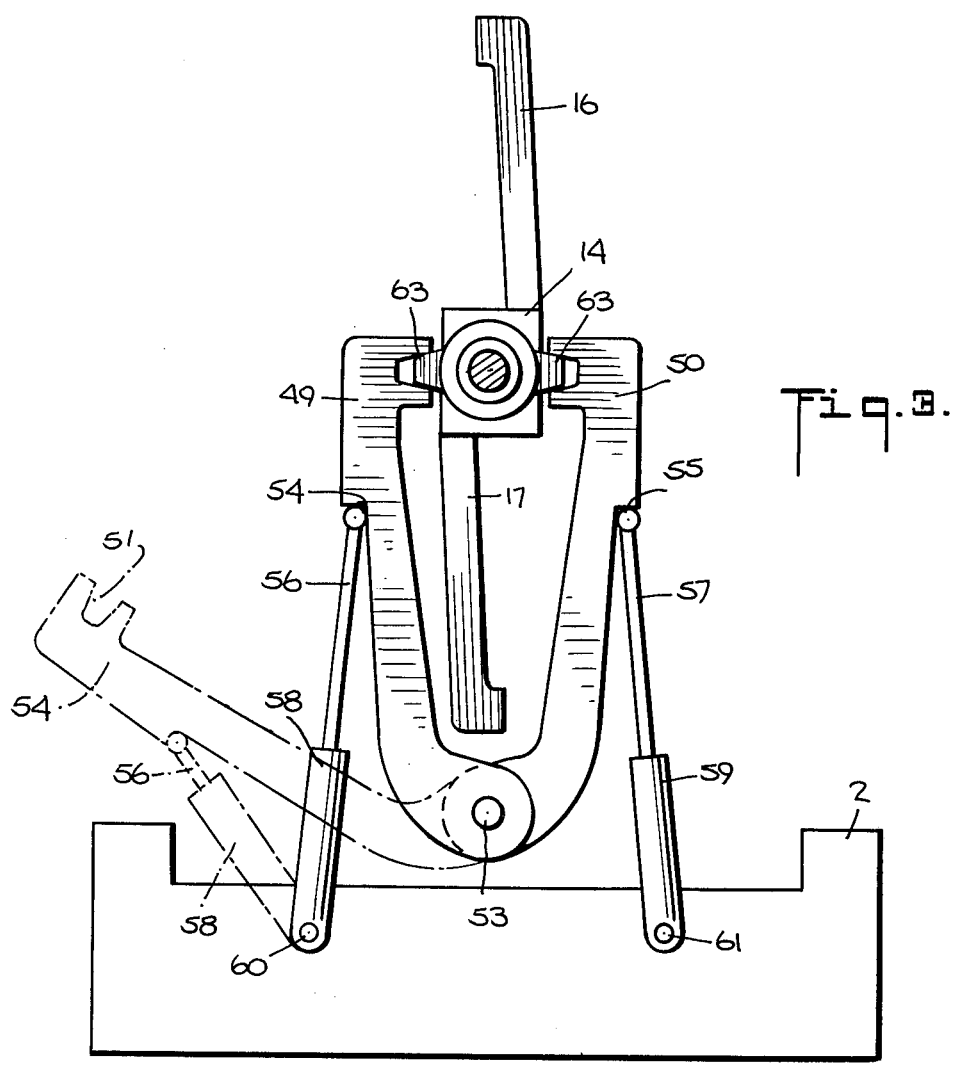
FIG. 3 is an end elevation view of the right hand end of the apparatus shown in FIG. 1 with the temporary supporting apparatus included.
Figure 4:
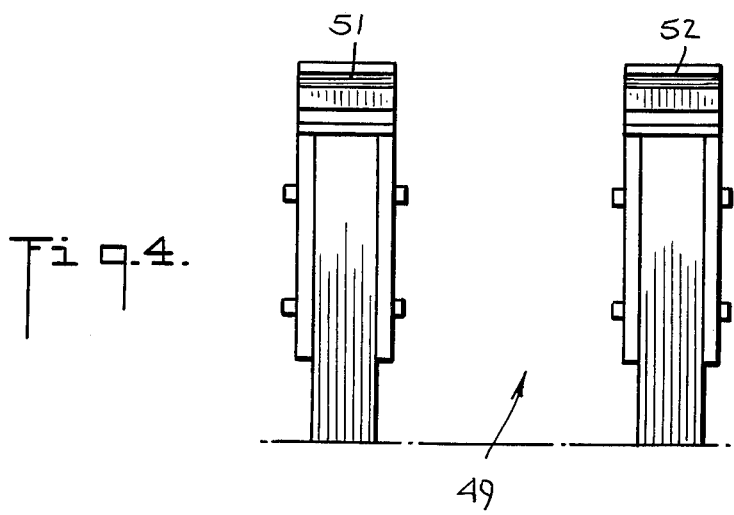
FIG. 4 is a fragmentary, side elevation view of two of the jaws forming part of the apparatus for temporarily supporting the winding mandrel.

Said gripping means comprise two jaws 49 and 50 (FIG. 3), each one with a pair of sockets, e.g. sockets 51 and 52 of the jaw 49 shown in FIG. 4. The jaws 49 and 50 (FIG. 3) are hinged together on a shaft 53, and they have points 54 and 55 at their sides, connected to pneumatic piston rods 56 and 57 which are slidable in the cylinders 58 and 59 which are hinged at points 60 and 61 on the structure 2.

The sockets on the jaws 49 and 50 grip first and second pairs of projections 62 and 63 (FIG. 1) having their shape corresponding to the jaw sockets. The projections 62 and 63 are disposed, respectively, on the cylindrical body 14 and on the mandrel 9, in a symmetrical position with respect to the vertical plane containing the axis of the mandrel 9.

When in operation, the apparatus functions as described hereinafter. Normally, the wires 20 and 21 (FIG. 1), owing to the rotation of the cage 10 around the axis of the mandrel 9, are wound around the axis of the mandrel 9 and are wound continuously from off the bobbins 18 and 19 which are carried around the shaft 7.

The turns helically formed around the mandrel 9 are pushed along the mandrel by the cam 15, or by other equivalent means which are capable of carrying out the said pushing action. In other words, each turn slides down the face of the cam 15 and pushes the preceding turns along the mandrel 9.

When the bobbins 18 and 19 are emptied, they are replaced by other full bobbins by means of the following steps:

(1) First the motor 12 is stopped in such a way that the cage 10 is in the position shown in FIG. 1 so that the winding arms 23 and 25 and the ends 33 and 34 of the plates 16 and 17 are in a plane which is perpendicular to the supporting plane of the apparatus and which intersects the axis of the mandrel 9 and constitutes a plane of symmetry for the two jaws 49 and 50 (see FIG. 3).

(2) Next the cylinders 58 and 59 (FIG. 3) are activated in such a way that the relative pneumatic piston rods 56 and 57, by exercising a pushing action on the points of application 54 and 55 of the jaws 49 and 50, cause the jaws 49 and 50 to rotate around the hinge 53 until the sockets of such jaws have become engaged with the protuberances 62 and 63 of the cylindrical body 14 and of the mandrel 9.

After the body 14 and the mandrel 9 have been gripped by the jaws 49 and 50, the lever arm 48 is actuated in such a way as to cause the rotation of the sleeve 37 (FIG. 2) around the mandrel axis, i.e. with the consequent unscrewing of the threaded cylindrical surface of the sleeve 37. At the end of this phase, the shaft 7 and the mandrel 9 are detached from each other, and a new phase is initiated during which, either manually or through automatic means, the base 6 is moved along the rails 5 for removing the pins 29 and 30 of the winding arms 23 and 25 from the holes 31 and 32 of the plates 16 and 17.

As a result, the apparatus subdivides into two parts, the first being fast with the base 6 carrying the shaft 7, the bobbins 18 and 19, the cage 10. The second part is fixed in space, and in the same stopped condition of the apparatus by means of the jaws 49 and 50, and comprises the mandrel 9 and the cylindrical body 14 with the plates 16 and 17 and the cam 15. The apparatus appears now as shown in FIG. 5.

In a further phase, succeeding the separation of the two parts of the apparatus, the empty bobbins are replaced by bobbins filled with the wire. On completion of this phase, the two parts of the apparatus are brought together by proceeding opposite to the steps used for separating the two parts.

The phases just described for separating the apparatus take place advantageously, in a simple manner and without losing the original orientation between the two parts which have to be separated in order to take off the bobbin from the mandrel. This condition is important since it determines a rapid and precise separating and bringing together of the apparatus which, therefore, can be carried out through any automatic means, and within an extremely short period of time. The characteristic which allows for obtaining this condition is derived from the fact that the jaws 49 and 50 enter into their sockets simultaneously, both on the mandrel 9 as well as on the cylindrical body 14, thereby preventing any relative rotation.

The invention has been described in connection with the simultaneous winding of two wires, 20 and 21, on the mandrel 9, but it will be apparent that the principles of the invention may be applied to the winding of other elongated bodies, e.g. strands, filaments, tapes, strips etc. made of metals, cloth, glass, etc. or to the winding of a different number of such bodies. For example, one of the bobbins 18 or 19 may be omitted with the resulting winding of a single wire on the mandrel 9.

Similarly, although the cage 10, the shaft 7, the bobbins 18 and 19 and their supports preferably are movable with respect to the base 2 for separating the two parts of the apparatus, it is also possible to maintain the cage 10, the shaft 7, the bobbins 18 and 19 and their supports stationary and to separate the two parts by moving the base 2 along suitable guides or rails.

Although the preferred embodiment of the present invention has been illustrated and described, it will be apparent to those skilled in the art that various modifications may be made without departing from the principles of the invention.

The embodiments of the invention in which an exclusive property of privilege is claimed are defined as follows:

1. Winding apparatus for forming a helix from an elongated body, said apparatus comprising first and second parts separable from each other, said first part comprising at least one bobbin for carrying said body thereon, means rotatably mounting and supporting said bobbin, a cage, and means supporting and rotatably mounting said cage for rotation around said bobbin and for unwinding said body from said bobbin, said second part comprising a mandrel having its axis aligned with the axis of rotation of said bobbin and guide means for guiding said body onto said mandrel, said guide means being rotatably mounted and releasably connected for rotation with said cage when said parts are unseparated, and said apparatus further comprising gripping means for alternately gripping and holding and releasing said mandrel and said guide means, and means mounting said gripping means and said first part for relative movement in the direction of said axis of said mandrel for separating said first part from said second part.

2. Apparatus as set forth in claim 1 wherein said means for rotatably mounting and supporting said bobbin and said means for supporting and rotatably mounting said cage comprise a support and a shaft extending from said support with its axis aligned with said axis of said bobbin.

3. Apparatus as set forth in claim 2 wherein said means mounting said gripping means and said first part for relative movement comprises a base with at least one rail extending substantially parallel to said axis of said bobbin, said gripping means being mounted on said base and said support being slidably mounted on said rail.

4. Apparatus as set forth in claim 2 wherein said mandrel has a frusto-conical end surface and said shaft has a mating frusto-conical end surface, said end surface of said mandrel engaging said end surface of said shaft for aligning said mandrel with said shaft.

5. Apparatus as set forth in claim 2 wherein said shaft has a threaded sleeve rotatably mounted thereon and said mandrel has a threaded end portion in engagement with the threads on said sleeve.

6. Apparatus as set forth in claim 1 wherein said guide means comprises a cylindrical body rotatably mounted on said mandrel, a cam secured to said cylindrical body on the side thereof facing away from said bobbin for moving turns of said elongated body along said mandrel, and connecting means extending from said body to said cage and having means engagable with said cage.

7. Apparatus as set forth in claim 6 wherein said connecting elements are plates extending generally radially from said cylindrical body and said means engagable with said cage are at the ends of said plates remote from said cylindrical body.

8. Apparatus as set forth in claim 1 wherein said means mounting said gripping means and said first part comprises a base and said gripping means comprises jaws pivotally mounted with respect to each other, one jaw being mounted at one side of said mandrel and another jaw being mounted at the opposite side of said mandrel, and drive means extending between said base and said jaws for moving said jaws into and out of engagement with said mandrel.

9. Apparatus as set forth in claim 1 wherein said guide means comprises a cylindrical body rotatably mounted on said mandrel, wherein said means mounting said gripping means and said first part comprises a base and wherein said gripping means comprises a first pair of jaws and a second pair of jaws, said first pair of jaws being pivotally mounted with respect to each other with one jaw on one side of said mandrel and engagable with the latter and the other jaw on the opposite side of said mandrel and engagable with said mandrel and said second pair of jaws being pivotally mounted with respect to each other with one jaw on one side of said cylindrical body and engagable with the latter and the other jaw on the opposite side of said cylindrical body and engagable with the latter, and drive means extending between said base and said jaws for moving said jaws into and out of engagement with said mandrel and said cylindrical body.

10. Apparatus as set forth in claim 9 wherein said drive means comprises fluid operable piston and cylinder assemblies connected between said base and said jaws, wherein said mandrel and said cylindrical body have projections thereon and wherein said jaws have cavities therein for receiving said projections and preventing rotation of said cylindrical body relative to said mandrel.

* * * * *